United States Patent [19]

Gertisser

[11] 4,246,404

[45] Jan. 20, 1981

[54] BASIC INDOLINE DYESTUFFS

[75] Inventor: Berthold Gertisser, Münchenstein, Switzerland

[73] Assignee: Sandoz Ltd., Basel, Switzerland

[21] Appl. No.: 38,353

[22] Filed: May 11, 1979

[30] Foreign Application Priority Data

May 12, 1978 [CH] Switzerland .......................... 5206/78

[51] Int. Cl.³ ...................... C09B 19/00; C09B 23/10
[52] U.S. Cl. .................................... 542/466; 544/105; 542/465
[58] Field of Search ................. 542/466, 465; 544/105

[56] References Cited

U.S. PATENT DOCUMENTS

| | | | |
|---|---|---|---|
| 2,166,736 | 7/1939 | White | 542/466 |
| 3,597,424 | 8/1971 | Hunter | 542/466 |
| 3,853,859 | 12/1974 | Hunter | 542/466 |

*Primary Examiner*—John D. Randolph
*Attorney, Agent, or Firm*—Gerald D. Sharkin; Richard E. Vila; Thomas C. Doyle

[57] ABSTRACT

Basic dyestuffs free of sulphonic acid groups contain an indoline group the 2-position of which is connected through a vinylene group to the N-atom of a 2,3-dihydro-4H-1,4-benzoxazine group. The dyestuffs are useful for the dyeing of leather, paper and plastics and, particularly, polyacrylonitrile or acid-modified polyester fibres.

13 Claims, No Drawings

BASIC INDOLINE DYESTUFFS

This invention relates to basic dyestuffs free of sulphonic acid groups.

The invention provides compounds of formula I

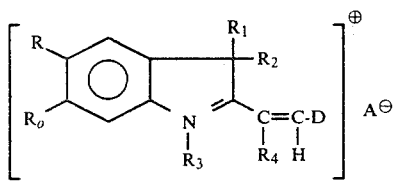

in which
R is—hydrogen; halogen; cyano; nitro; $C_{1-4}$alkyl which is unsubstituted or mono-substituted by phenyl, monochlorophenyl or mono ($C_{1-4}$alkyl)-phenyl; $C_{1-4}$alkoxy which is unsubstituted or mono-substituted by phenyl; phenoxy; acetyl or di-($C_{1-4}$alkyl)sulphonylamino, $R_o$—is hydrogen, $C_{1-4}$alkyl or $C_{1-4}$ alkoxy, or R and $R_o$ together form a group of formula $-O-CH_2-O-$, $-O-CH_2-CH_2-O-$, $-O-CH_2-O-CH_2-$, $+CH_2)_4$ or $+CH_2)_5$, in which the asymmetric $-O-CH_2-O-CH_2-$ group may be connected in either of both possible ways, $R_1$—and $R_2$ are independently linear $C_{1-4}$alkyl, $R_3$—is allyl, unsubstituted $C_{1-4}$alkyl or $C_{1-4}$alkyl monosubstituted by hydroxy, phenyl, carbonamido, cyano or $C_{1-4}$alkoxy, $R_4$—is hydrogen, cyano, carboxyl, $C_{1-4}$alkyl, carbonamido or $-COO-(C_{1-4})$alkyl, D—is a group of formula II or III

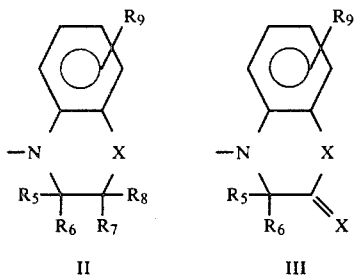

in which
$R_5$ is hydrogen, $C_{1-4}$alkyl, phenyl unsubstituted or substituted by one or two groups selected from methoxy, chloro, methyl or dimethylamino, or $-COO-(C_{1-4}$alkyl), $R_6$ and $R_8$ are independently hydrogen or $C_{1-4}$alkyl, $R_7$ is hydrogen, $C_{1-4}$alkyl, phenyl or $-COO-(C_{1-4}$alkyl), or $R_7$ and $R_5$ together with the carbon atoms to which they are attached form an unsubstituted cyclopentyl or cyclohexyl ring, $R_9$ is hydrogen, halogen, $C_{1-4}$alkyl, $C_{1-4}$alkoxy, amino, di($C_{1-4}$alkyl) amino, $C_{2-5}$acylamino, $-NH-SO_2-(C_{1-4}$alkyl), $-NH-SO_2-$phenyl or a benzoylamino group unsubstituted or substituted by one or two chlorine atoms or one or two $C_{1-4}$alkyl groups, X is oxygen or sulphur, and A is an anion.

Preferred significances of the groups $R-R_{10}$ and X are as follows:

R: hydrogen, halogen, unsubstituted alkyl, unsubstituted or phenyl-substituted alkoxy, phenoxy or dialkylsulphonylamino $R_o$: hydrogen $R_4$: hydrogen $R_5$: hydrogen, alkyl or phenyl $R_7$: hydrogen, alkyl or phenyl $R_9$: hydrogen, halogen, alkyl, alkoxy, amino-, dialkylamino, acylamino, or benzoylamino; more preferably hydrogen, amino, acylamino or alkoxy.

X: oxygen.

By halogen is meant fluorine, chlorine, bromine and iodine, preferably chlorine.

Where any of R, $R_1$, $R_2$, $R_6$, $R_7$, $R_8$ and $R_9$ are alkyl, they are, independently, preferably methyl. Where R is alkoxy it is preferably methoxy, where R is phenyl-substituted alkoxy it is preferably benzyloxy, and where R is dialkylsulphonylamino it is preferably dimethylsulphonylamino.

Where $R_3$ is alkyl it is preferably methyl, ethyl or propyl, and where $R_3$ is substituted alkyl it is preferably 2-hydroxyethyl, 2-hydroxypropyl, 2-cyanoethyl or 2-carboxamidoethyl.

Where $R_5$ is alkyl it is preferably methyl or ethyl, more preferably methyl.

Where $R_9$ is alkoxy it is preferably methoxy, and where $R_9$ is acylamino it is preferably acetylamino.

Preferably R is $R_a$ where $R_a$ is hydrogen, chloro, methyl, methoxy, phenoxy, benzyloxy or dimethylsulphonylamino, more preferably $R_b$ where $R_b$ is hydrogen, chloro or methoxy.

$R_3$ is preferably $R_{3a}$ where $R_{3a}$ is methyl, ethyl, propyl, allyl, 2-hydroxyethyl, 2-hydroxypropyl, 2-cyanoethyl or 2-carboxamidoethyl, more preferably methyl.

$R_5$ is preferably $R_{5a}$ where $R_{5a}$ is hydrogen, methyl ethyl or phenyl, more preferably $R_{5b}$ where $R_{5b}$ is hydrogen, methyl or phenyl.

$R_6$ and $R_8$ are preferably $R_{6a}$ and $R_{8a}$ where $R_{6a}$ and $R_{8a}$ are independently hydrogen or methyl, more preferably hydrogen.

$R_7$ is preferably $R_{7a}$ where $R_{7a}$ is hydrogen, methyl or phenyl, more preferably $R_{7b}$ where $R_{7b}$ is hydrogen or methyl.

$R_9$ is preferably $R_{9a}$ where $R_{9a}$ is hydrogen, chloro, methyl, methoxy, ethoxy, amino, acetylamino, dimethylamino or benzoylamino, more preferably $R_{9b}$ where $R_{9b}$ is hydrogen, amino, acetylamino or methoxy.

A preferred group of compounds of formula I are those of formula IV

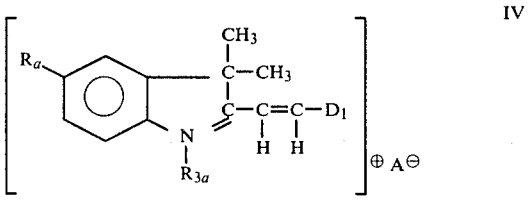

in which $R_a$ and $R_{3a}$ are as defined above, and $D_1$ is a group of formula $II_a$ or $III_a$

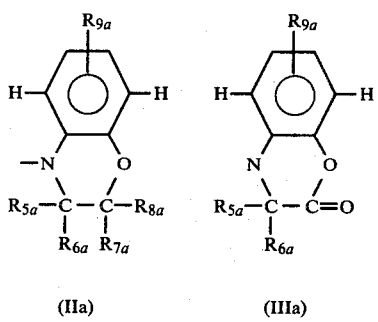

(IIa)    (IIIa)

in which $R_{5a}$, $R_{6a}$, $R_{7a}$, $R_{8a}$ and $R_{9a}$ are as defined above.

Particularly preferred are those of formula V

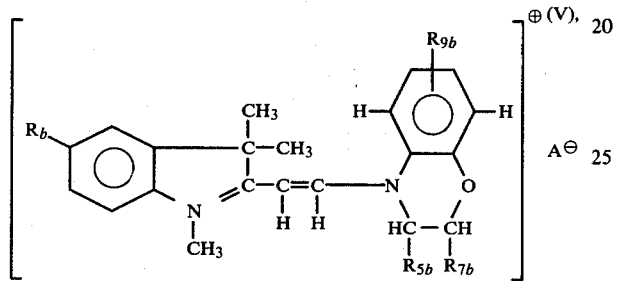

in which $R_b$, $R_{5b}$, $R_{7b}$ and $R_{9b}$ are as defined above.

The invention also provides a process for the preparation of compounds of formula I characterized by (A) the reaction of a compound of formula VI

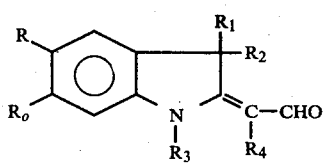

with a compound of formula VII or VIII

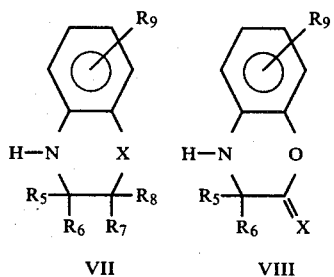

VII    VIII in the presence of an acid of formula HA, or (B) the reaction of a compound of formula IX

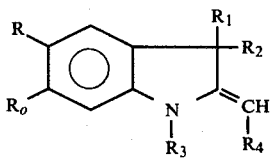

with a compound of formula X or XI

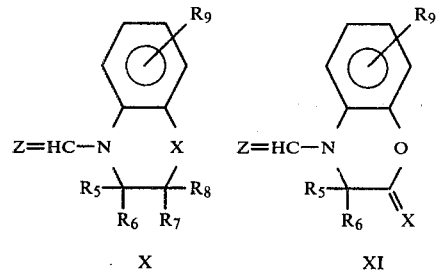

X    XI in which Z is $=O$, $=N-R_{11}$, or $=N^{\oplus}HR_{11} A^{\ominus}$, and $R_{11}$ is hydrogen or $C_{1-4}$alkyl,
in the presence of a Lewis acid.

Process variant (A) may be carried out in conventional manner, for example in water or organic solvents or a mixture thereof at a temperature from room temperature to 80° C., preferably 50°-70° C. Preferably the acid used is hydrochloric acid. Process variant (B) is also conventional and may be carried out in an organic solvent, for example chlorobenzene or toluene, from room temperature to 80° C., preferably at 50°-70° C. Preferred Lewis acids are phosphorus oxychloride and aluminium chloride.

The compounds of formulae VI and IX are known, and those of formulae VII, VIII, X and XI are either known (for example from German Patent 2 234 468) or may be prepared in analogous manner to known compounds.

The anion $A^{\ominus}$ in compounds of formula I may be a non-chromophoric organic or inorganic anion, for example chloride, bromide, sulphate, bisulphate, methylsulphate, aminosulphate, perchlorate, lactate, succinate, tartrate, malate, methane sulphonate or benzoate; or may be a complex anion for example of boric, citric, glycollic, diglycollic or adipic acids.

The anion $A^{\ominus}$ may be exchanged for other anions for example with the aid of an ion-exchange resin or by reaction with salts or acids. Such reaction may take place in more than one step, for example through the hydroxide or bicarbonate, or according to French Pat. Nos. 2 028 725 or 2 028 726.

The compounds of formula I are dyestuffs and are useful for the dyeing of cationically dyeable substrates such as leather, paper and plastics, and particularly for the dyeing or printing of textile substrates containing or consisting of fibres of homopolymers or copolymers of acrylonitrile or asymmetric dicyanoethylene, or of acid-modified polyamides or polyesters. Such polyamides and polyesters are described in Belgian Pat. No. 706 104 and U.S. Pat. No. 3 379 723 respectively.

The compounds may be worked up by conventional means into solid or liquid compositions, for example by granulation or by dissolving in a suitable solvent, optionally in the presence of additives such as stabilisers or solubilising agents such as urea. Such preparations may be obtained for example as described in French Pat. Nos. 1 572 030 and 1 581 900 or German patent publications 2 001 748 and 2 001 816.

Textile material may be dyed in neutral or acidic aqueous media at temperatures of from 60°-100° C. at atmospheric pressure or at temperatures over 100° C. under pressure. Alternatively, dyeing may be carried out in organic solvents, for example as described in German patent publication No. 2 437 549.

The dyeings obtained from compounds of formula I on the above substrates show good light fastness. The dyestuffs have good compatibility with other basic dyes, and have advantageously low compatibility numbers (K-values). The dyes have good exhaust power on the above substrates, giving dyeings with good fastness to washing, sweat, sublimation, pleating, decatising, ironing, water, seawater, dry cleaning, overdyeing and solvents. The dyestuffs are resistant to hydrolysis, have good water solubility and give deep level dyeings.

The following Examples in which parts and percentages are by weight and temperatures are in degrees centigrade, illustrate the invention.

EXAMPLE 1 (Process Variant A)

23.5 Parts 1,3,3-trimethyl-5-chloro-2-methyleneindoline-ω-aldehyde and 14.9 parts 3-methyl-2,3-dihydro-4H-1,4-benzoxazine are suspended in 200 parts water at 50°–60°. To the stirred mixture is added dropwise over 3 hr 50 parts of 2N hydrochloric acid, maintaining the temperature at 50°–60°. A yellow solution is obtained, which on cooling to room temperature gives the dyestuff of formula

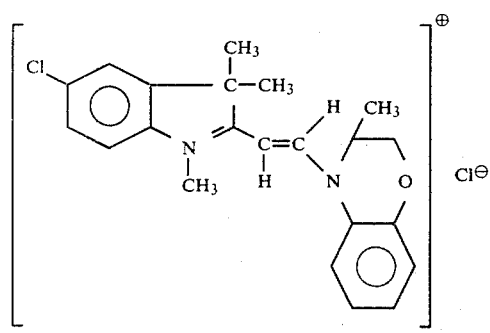

in the form of yellow crystals. The product may be salted out practically completely by addition of sodium chloride. The dyestuff dyes polyacrylonitrile and basic-dyeable polyester and polyamide fibres in brilliant greenish-yellow tones with good light- and wet-fastness.

EXAMPLES 2–53

In manner analogous to Example 1 and using corresponding starting materials, dyestuffs of formula

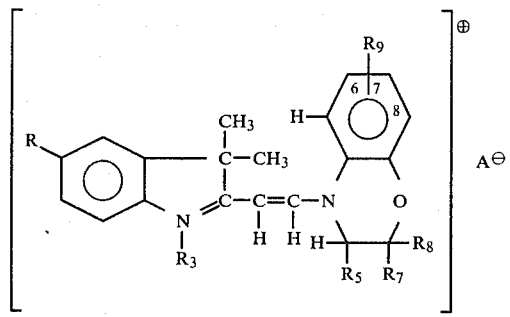

may be obtained, in which R, $R_3$, $R_5$, $R_7$, $R_8$ and $R_9$ are as shown in the following Table. The number given in the column for $R_9$ indicates the position of the substituent. The anion $A^\ominus$ may be any of those described above.

| Ex. No. | R | $R_3$ | $R_5$ | $R_7$ | $R_8$ | $R_9$ |
|---|---|---|---|---|---|---|
| 2 | OCH₃ | CH₃ | H | H | H | H |
| 3 | OC₂H₅ | " | H | H | H | H |
| 4 | O—CH₂—⌬ | " | H | H | H | H |
| 5 | O—⌬ | " | H | H | H | H |
| 6 | Cl | " | H | H | H | H |
| 7 | H | n-C₃H₇ | C₂H₅ | H | H | (6) OC₂H₅ |
| 8 | —CH₂—⌬ | CH₃ | H | H | H | H |
| 9 | CH₃ | " | H | H | H | H |
| 10 | H | —CH₂—CH=CH₂ | H | H | H | (7) NH₂ |
| 11 | NO₂ | CH₃ | H | H | H | H |
| 12 | H | CH₂—CH₂OH | H | H | H | H |
| 13 | SO₂—N(CH₃)₂ | CH₃ | H | H | H | H |
| 14 | H | CH₂—CH(OH)—CH₃ | H | H | H | (7) —NH—CO—⌬ |
| 15 | H | CH₂—CH₂—CN | H | ⌬ | H | H |
| 16 | H | C₂H₅ | H | H | H | H |
| 17 | H | CH₃ | CH₃ | H | H | H |
| 18 | CN | " | " | H | H | H |
| 19 | H | C₂H₄CO—NH₂ | H | H | H | H |

| Ex. No. | R | $R_3$ | $R_5$ | $R_7$ | $R_8$ | $R_9$ |
|---|---|---|---|---|---|---|
| 20 | CO—CH₃ | CH₃ | CH₃ | H | H | H |
| 21 | F | CH₃ | CH₃ | H | H | H |
| 22 | O—CH₂—C₆H₅ | " | " | H | H | H |
| 23 | H | " | " | COOC₂H₅ | H | H |
| 24 | H | " | —C₆H₅ | H | H | H |
| 25 | H | " | —C₆H₄—OCH₃ | H | H | H |
| 26 | H | " | —C₆H₃(OCH₃)₂ | H | H | H |
| 27 | H | " | —C₆H₄—Cl | H | H | H |
| 28 | H | " | —C₆H₄—CH₃ | H | H | H |
| 29 | H | " | —C₆H₄—N(CH₃)₂ | H | H | H |
| 30 | H | " | CH₃ | CH₃ | H | H |
| 31 | H | " | " | " | CH₃ | H |
| 32 | H | " | $R_5$ together with $R_7$ —CH₂—CH₂—CH₂—CH₂— | | H | H |
| 33 | H | " | CH₃ | H | H | (7) OCH₃ |
| 34 | H | CH₃ | CH₃ | H | H | (7) CH₃ |
| 35 | H | " | " | H | H | (7) Cl |
| 36 | H | " | " | H | H | (7) —N(CH₃)₂ |
| 37 | H | " | " | H | H | (7) —N(C₂H₅)₂ |
| 38 | H | " | " | H | H | (6) NH—C(=O)—CH₃ |
| 39 | H | " | " | " | H | (6) OCH₃ |
| 40 | H | " | " | " | H | (6) Cl |
| 41 | H | " | " | " | H | (6) F |
| 42 | H | " | " | " | H | (6) CH₃ |
| 43 | H | " | —C₆H₅ | " | H | (6) Br |
| 44 | H | " | CH₃ | CH₃ | H | (6) Cl |
| 45 | H | " | " | " | H | (7) CH₃ |
| 46 | H | " | " | H | H | (6) CH₃ |
| 47 | H | " | " | H | H | (8) CH₃ |
| 48 | H | " | " | H | H | (8) Cl |
| 49 | H | CH₃ | H | H | H | H |

The dyestuffs of Examples 2–4, 22 and 33 dye polyacrylonitrile in yellow shades, those of Examples 5–9, 11–21, 23–32, 34, 35 and 39–49 in greenish-yellow shades, and those of Examples 10 and 36–38 in reddish-yellow shades. The dyeings show good light- and wet-fastness.

EXAMPLE 54 (Process variant B)

A mixture of 14.9 parts 3-methyl-2,3-dihydro-1 H-1,4-benzoxazine, 10 parts formic acid and 120 parts chlorobenzene is warmed to 140° with stirring, approx. 70 parts of solvent are removed by distillation, and the residue is cooled to 30°.

16 Parts phosphorus oxychloride are then stirred in, and finally 17.3 parts 1,3,3-trimethyl-2-methylene-2,3-dihydroindole are added dropwise with stirring. Stirring is continued without heating for 30 min., then for 3 hr at 50°–60°. The dyestuff which separates from the reaction mixture is separated from the solvent, dissolved in 800 parts water and salted out with sodium chloride, to give the dyestuff of Example 17 above.

Application Example A

Polyacrylonitrile fibres are added to an aqueous dyebath at 60° containing 0.125 g/l glacial acetic acid, 0.375 g/l sodium acetate and 0.15 g/l of the dyestuff of Example 1 (or a corresponding quantity of a solid or liquid preparation of this dyestuff), the liquor-to-goods ratio being 80:1. The dyebath is brought to the boil over 20–30 min., and kept at the boil for 90 min. The substrate is rinsed and dried to give a greenish-yellow dyeing with good fastness properties.

Application Example B

Acid-modified polyester fibres are added to an aqueous dyebath at 20°, containing 3 g/l sodium sulphate, 2 g/l ammonium sulphate and 2.5 g/l of a nonionic carrier, the liquor-to-goods ratio being 40:1. The pH is regulated to 5.5 by addition of formic acid. The bath is heated to 60°, and 0.15 g/l of the dyestuff of Example 1 (or a corresponding amount of a solid or liquid preparation thereof) is added. The bath is heated to boiling point over 30 minutes, and held at the boil for 60 min. After rinsing and drying, a greenish-yellow dyeing with good fastness properties is obtained.

Application Example C

Acid-modified polyester fibres are added to an aqueous dyebath at 20° C. containing 6 g/l sodium sulphate, 2 g/l ammonium sulphate and 0.15 g of the dyestuff of Example 1 (or a corresponding amount of a solid or liquid preparation thereof). The liquor-to-goods ratio is 30:1. The pH is regulated to 5.5 with formic acid, and the bath is heated in a closed vessel to 110°–120° over 45 minutes, and held at that temperature, with shaking, for 60 min. After rinsing and drying, a greenish-yellow dyeing with good fastness properties is obtained.

Application Example D

Acid-modified polyamide fibres are added to an aqueous dyebath at 20°, containing 3.6 g/l sodium hydrogen sulphate, 0.7 g/l sodium sulphate, 1 g/l of an auxiliary consisting of the reaction product of a phenol with excess ethylene oxide, and 0.15 g/l of the dyestuff of Example 1 (or a corresponding amount of a solid or liquid preparation thereof). The liquor-to-goods ratio is 80:1. The bath is heated to the boil over 30 min. and kept at the boil for 60 min. After rinsing and drying a greenish-yellow dyeing with good fastness properties is obtained.

What is claimed is:

1. A compound of formula I,

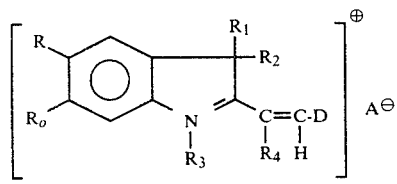

in which
R is —hydrogen; halogen; cyano; nitro; $C_{1-4}$alkyl which is unsubstituted or mono-substituted by phenyl, mono-chlorophenyl or mono ($C_{1-4}$alkyl) phenyl; $C_{1-4}$alkoxy which is unsubstituted or mono-substituted by phenyl; phenoxy; acetyl or di-($C_{1-4}$alkyl) sulphonylamino, $R_o$—is hydrogen, $C_{1-4}$alkyl or $C_{1-4}$ alkoxy, or, R and $R_o$ together form a group of formula —O—CH$_2$—O—, —O—CH$_2$—CH$_2$—O—, —O—CH$_2$—O—CH$_2$—, $\text{-(CH}_2\text{)}_4$ or $\text{-(CH}_2\text{)}_5$, in which the asymmetric —O—CH$_2$—O—CH$_2$— group may be connected in either of both possible ways, $R_1$ and $R_2$ are independently linear $C_{1-4}$alkyl, $R_3$—is allyl, unsubstituted $C_{1-4}$alkyl or $C_{1-4}$alkyl monosubstituted by hydroxy, phenyl, carbonamido, cyano or $C_{1-4}$alkoxy, $R_4$—is hydrogen, cyano, carboxyl, $C_{1-4}$alkyl, carbonamido or —COO—($C_{1-4}$)alkyl, D—is a group of formula II or III

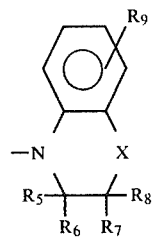 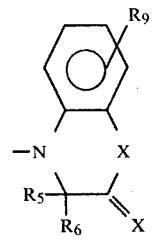

II    III in which
$R_5$ is hydrogen, $C_{1-4}$alkyl, phenyl unsubstituted or substituted by one or two groups selected from methoxy, chloro, methyl or dimethylamino, or —COO—($C_{1-4}$alkyl), $R_6$ and $R_8$ are independently hydrogen or $C_{1-4}$alkyl, $R_7$ is hydrogen, $C_{1-4}$alkyl, phenyl or —COO—($C_{1-4}$alkyl), or, $R_7$ and $R_5$ together with the carbon atoms to which they are attached form an unsubstituted cyclopentyl or cyclohexyl ring, $R_9$ is hydrogen, halogen, $C_{1-4}$alkyl, $C_{1-4}$alkoxy, amino, di($C_{1-4}$alkyl) amino, $C_{2-5}$acylamino, —NH—SO$_2$—($C_{1-4}$alkyl), —NH—SO$_2$—phenyl or a benzoylamino group unsubstituted or substituted by one or two chlorine atoms or one or two $C_{1-4}$alkyl groups, X—is oxygen or sulphur, and, A—is an anion.

2. A compound accorrding to claim 1 in which R is $R_a$ where $R_a$ is hydrogen, chloro, methyl, methoxy, phenoxy, benzyloxy or dimethylsulphonylamino.

3. A compound according to claim 1 in which $R_o$ is hydrogen.

4. A compound according to claim 1 in which $R_1$ and $R_2$ are methyl.

5. A compound according to claim 1 in which $R_3$ is $R_{3a}$ where $R_{3a}$ is methyl, ethyl, propyl, allyl, 2-hydroxyethyl, 2-hydroxypropyl, 2-cyanoethyl or 2-carboxyamidoethyl.

6. A compound according to claim 1 in which X is oxygen.

7. A compound according to claim 6 in which D is $D_1$
where
$D_1$ is a group of formula IIa or IIIa

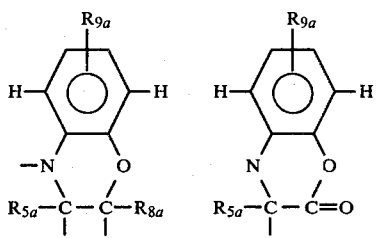

(IIa)      (IIIa)

in which $R_{5a}$ is hydrogen, methyl, ethyl or phenyl $R_{6a}$ and $R_{8a}$ are independently hydrogen or methyl, $R_{7a}$ is hydrogen, methyl or phenyl, and, $R_{9a}$ is hydrogen, chloro, methyl, methoxy, ethoxy, amino, acetylamino, dimethylamino or benzoylamino.

8. A compound according to claim 7 of formula IV

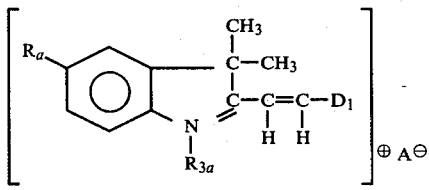

in which $R_a$ is hydrogen, chloro, methyl, methoxy, phenoxy, benzyloxy or dimethylsulphonylamino, and, $R_{3a}$ is methyl, ethyl, propyl, allyl, 2-hydroxyethyl, 2-hydroxypropyl, 2-cyanoethyl or 2-carboxamidoethyl.

9. A compound according to claim 8 of formula V

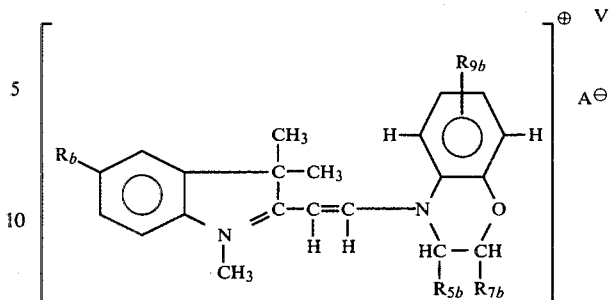

in which
$R_b$ is hydrogen, chloro or methoxy,
$R_{5b}$ is hydrogen, methyl or phenyl,
$R_{7b}$ is hydrogen or methyl
$R_{9b}$ is hydrogen, amino, acetylamino or methoxy, and
and $A^\ominus$ is an anion.

10. A compound according to claim 1 wherein
R is hydrogen, halogen, unsubstituted alkyl, unsubstituted or phenyl-substituted alkoxy, phenoxy or dialkylsulphonylamino;
$R_o$ is hydrogen;
$R_4$ is hydrogen;
$R_5$ is hydrogen, alkyl or phenyl;
$R_7$ is hydrogen, alkyl or phenyl;
$R_9$ is hydrogen, halogen, alkyl, alkoxy, amino-, dialkylamino, acylamino or benzoylamino; and
X is oxygen.

11. A compound according to claim 1 wherein $A^\ominus$ is a non-chromophoric organic or inorganic anion.

12. A compound according to claim 11, wherein $A^\ominus$ is a chloride, bromide, sulphate, bisulphate, methylsulphate, aminosulphate, perchlorate, lactate, succinate, tartrate, malate, methanesulphonate or benzoate anion or a complex anion of boric, citric, glycollic, diglycollic or adipic acid.

13. A compound according to claim 9 of the formula

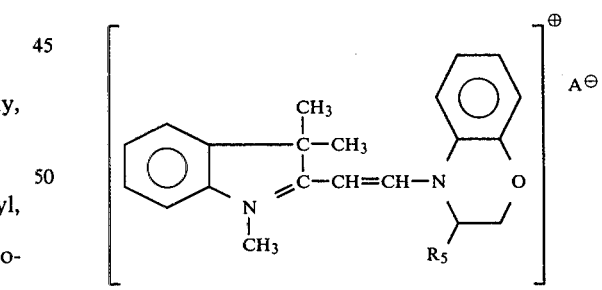

wherein $R_5$ is hydrogen or methyl.

* * * * *